United States Patent

[11] 3,565,111

[72] Inventor Swan A. Pearson
1900 3rd Ave., Rock Island, Ill. 61201
[21] Appl. No. 800,870
[22] Filed Feb. 20, 1969
[45] Patented Feb. 23, 1971

[54] SOLENOID-ACTUATED PILOT VALVE
17 Claims, 10 Drawing Figs.
[52] U.S. Cl. ................................................. 137/596.17,
137/315, 251/129, 335/278
[51] Int. Cl. ................................................. F16k 11/10,
F16k 31/02
[50] Field of Search ........................................ 137/332,
596.17; 251/129, 139, 141

[56] References Cited
UNITED STATES PATENTS
1,557,192  10/1925  Brunning ..................... 251/129X

| | | | |
|---|---|---|---|
| 2,359,017 | 9/1944 | Balsiger ........................ | 137/332 |
| 2,366,412 | 1/1945 | Lambert ........................ | 251/139X |
| 2,616,955 | 11/1952 | Dube et al. .................... | 251/139X |
| 3,125,321 | 3/1964 | Van Domelen ............... | 251/139 |
| 1,587,921 | 6/1926 | Ray ............................... | 251/139X |
| 3,340,773 | 9/1967 | Franz ............................ | 137/596.17X |

Primary Examiner—Henry T. Klinksiek
Attorney—Frank R. Thienpont

ABSTRACT: An improved solenoid-actuated pilot valve having a valve core of magnetic material and formed with an axial central bore and a plurality of offset radial discharge ports for rotating the core slightly each time it is raised off its seat. An improved split-shell housing for the solenoid is also provided to establish an efficient flux-return path for the magnetic field created by the solenoid.

Fig. 1.

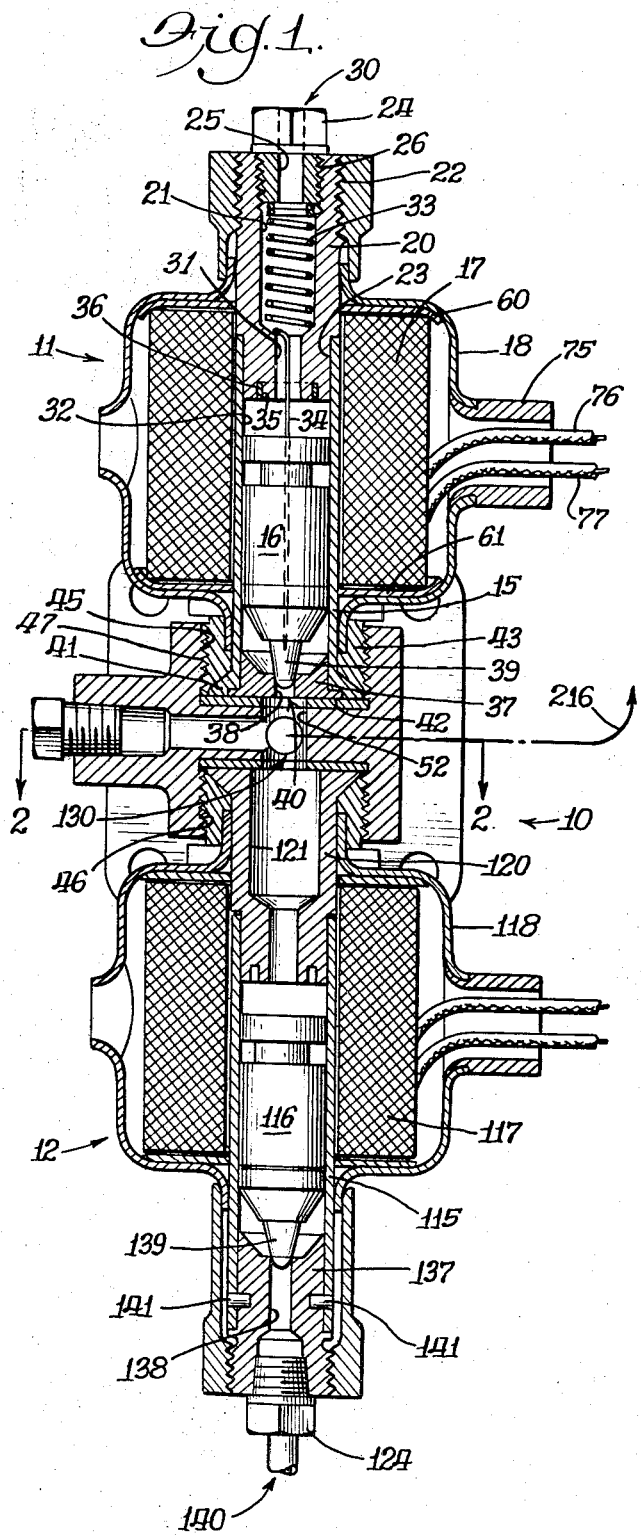
Fig. 1.
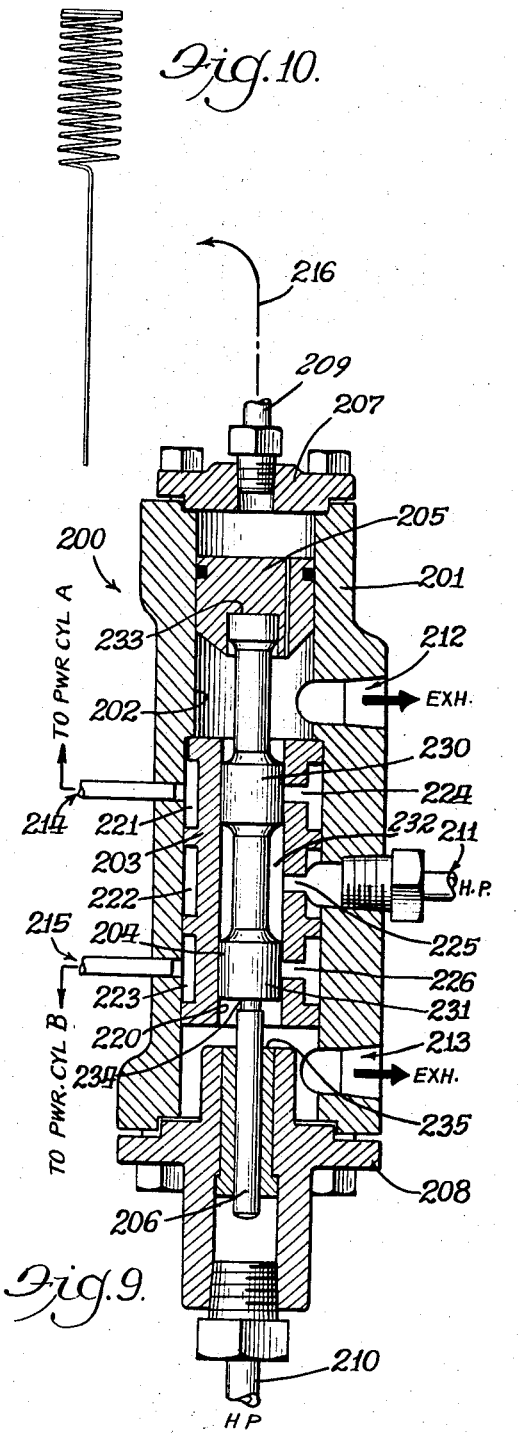
Fig. 10.
Fig. 9.
Inventor
Swan A. Pearson
By Frank R. Thienpont
Atty.

PATENTED FEB 23 1971
3,565,111
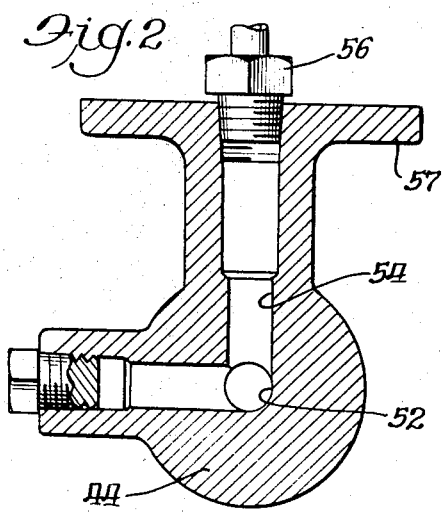
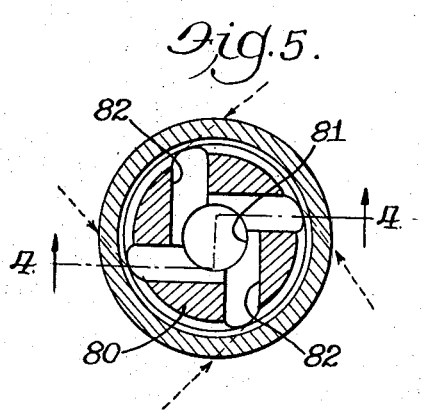
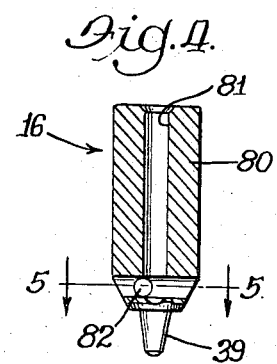
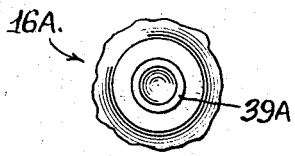
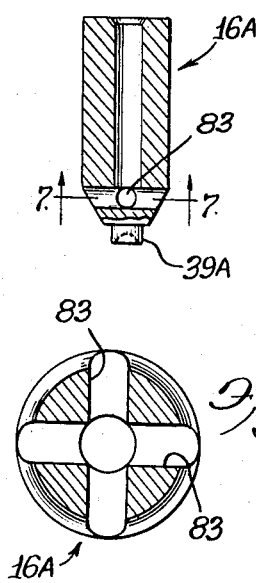
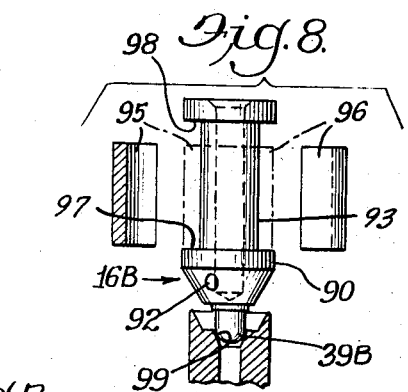
Inventor:
Swan A. Pearson
By Frank R Thuenpont
Atty.

3,565,111

SOLENOID-ACTUATED PILOT VALVE

This invention relates to valves and valve actuation and more particularly to electrically actuated valves of the solenoid type wherein the solenoid surrounds the valve port or flow line.

Solenoid actuated valves are well known in the art and have many different configurations. In nearly all cases, there is a magnetically actuated valve member which forms a fluidtight seal against a valve seat. Through repeated use, either the valve member or the seat may become distorted or worn so that they no longer provide an effective seal.

It is an object of this invention to provide an improved solenoid-operated pilot valve for controlling the flow of fluid under pressure and having a magnetically movable valve core adapted to form a fluidtight seal against a valve seat and including means for imparting a slight rotational motion to the valve core each time it is lifted away from the valve seat.

It is also an object to provide a split sleeve of high-permeability magnetic material surrounding the valve core and effective to provide a slight hammerlike impact to the valve core each time the solenoid is actuated to lift the core away from the seat or to reseat the core. The combination of the rotation of the valve core on each actuation of the solenoid and the light hammerlike blows tends to form the valve seat to conform to the shape of the valve core so that a perfect fluidtight seal is ensured even after prolonged use.

It is still another object to provide an improved split-shell housing of magnetic material for enclosing the solenoid and ensuring an efficient flux return path for the field created by the solenoid. The housing is split along the axis of the valve and parallel with the lines of flux so that there is no open circuit or gap in the flux path.

Other objects and advantages of the invention will become more readily apparent when considered in connection with the accompanying drawings in which:

FIG. 1 is a longitudinal sectional view of the pilot valve of the present invention;

FIG. 2 is a sectional view taken on line 2-2 of FIG. 1;

FIG. 3 is a side view showing the split solenoid housing;

FIG. 4 is a longitudinal sectional view of a valve core having offset radial ports;

FIG. 5 is an enlarged sectional view taken on line 5-5 of FIG. 4 and showing the orientation of the offset radial ports;

FIG. 6 is a sectional view of a valve core having true radial ports and an inverted cup-type of valve tip;

FIG. 6A is a bottom view of the inverted cup valve tip of FIG. 6.

FIG. 7 is an enlarged sectional view taken on line 7-7 of FIG. 6;

FIG. 8 is a modified form of valve core having a split-sleeve impact form;

FIG. 9 is a longitudinal sectional view of a hydraulically actuated shiftable control valve adapted for use with the pilot valve of FIG. 1; and FIG. 10 is a coiled compression spring used in the pilot valves.

The improved solenoid-operated pilot-control valve of the present invention is herein described and shown on the accompanying drawings wherein like characters-of-reference designate like parts in the several views.

The control valve assembly shown in FIG. 1 commonly known as a three-way valve, is designated generally by the numeral 10 and includes a solenoid-actuated inlet control valve 11 and a solenoid-actuated outlet control valve 12.

The valve 11 alone is commonly known as a two-way valve and comprises a cylindrical tube 15 of nonmagnetic material, a valve core 16 slidably disposed within the tube 15, a solenoid coil 17 surrounding the tube 15, and a split-shell housing 18 surrounding the solenoid coil 17. A cylindrical fitting 20 having an axially extending bore 21 therethrough and external threads 22 forms a fluidtight seal with the tube 15 at 23. An adapter plug or fitting 24 having an axially extending bore 25 therethrough is threaded into the bore 21 at 26. The bore 25 opens into the bore 21 and, collectively, they provide an inlet port 30 to the valve 11. The bore 21 is reduced in diameter at 31 and opens into a cylindrical cavity or bore 32 defined by the inner wall of the tube 15. The valve core 16 is constrained to move longitudinally within the bore 32. A coiled compression spring 33 such as is shown in FIG. 10 is disposed within the bore 21 and has a longitudinally extending shank 34 which extends through the bore 31 and acts against the bottom of fluid passage of core 16.

The fitting 20 has formed in its lower end a circular groove 35 around the bore 31 for retaining a copper shade ring 36. When the solenoid 17 is energized from an AC source, the lines of magnetic flux cutting across the ring 36 generate an e.m.f. and cause a current to flow therein. The current flowing in the coil 17 creates a magnetic flux field counter to the applied field. The shade ring 36 thereby functions to dampen rapid changes in flux in close proximity to the core 16 and tends to minimize unwanted vibration of the core 16.

A flanged cylindrical plug 37 is press-fitted into the lower end of tube 15 and is adapted to form a fluid tight seal therewith. The plug 37 is formed with a central bore or orifice 38 which functions as a valve seat for the tip 39 of core 16. The cylindrical tube 15, the fitting 20, and the plug 37 thus form a tube assembly in which the valve core 16 is slidably disposed. The plug 37 may be made of soft metal but could also be made of a plastic such as Teflon depending on the valve application. The plug 37 also may be formed with a bore in its upper end to receive replaceable valve seats to accommodate one of several valve tips such, for example, as are herein illustrated. The bore 38 and conduits connected to it collectively constitute an outlet port 40 for the valve 11. The tube 15 is shown as flanged or flared outwardly at 41 and receives the circular flanged edge 42 of plug 37. The flared edge 41 also cooperates with an internally tapered nut 43 for mounting the valve 11 on a mounting block 44.

The block 44 is generally cylindrical in shape and is formed with enlarged threaded axial bores 45 and 46. The bore 45 is formed with internal threads 47 and a flat bottom 48. The threads 47 are cut to mesh with external threads 49 formed on the nut 43. The nut 43 is also formed with notches 50 and 51 180° apart and adapted to receive a spanner wrench (not shown) for tightening the nut 43. When the nut 43 is tightened securely, the end of tube 15 forms a fluidtight seal with a gasket 48a disposed on the bottom 48 of the bore 45.

Referring to FIG. 2, the block 44 is formed with an axial port 52 and a radial bore or channel 54. The port 52 registers with the bore 38 and the channel 54 and the latter directs fluid to the fluid pressure responsive member to be controlled. A standard hydraulic fitting 56 is shown connected to the bore 54. The block 44 is formed with an integral base or mounting bracket for mounting the valve assembly on a stationary member.

The solenoid 17 may be a conventional coil of the proper number of turns and of the physical dimensions and wire size required for this application. The solenoid 17 surrounds the tube 15 and is sandwiched between steel washers 60 and 61. The washers 60 and 61 help to retain and protect the solenoid 17 within the housing 18 and also provide a portion of the flux-return path for the magnetic field created by the solenoid 17 when energized. The lines of flux, by definition, are parallel to the axis of the solenoids.

Referring now to FIG. 3, the housing 18 is seen to comprise two halves 63 and 64 split along a longitudinal axis and which, when joined together, form a complete shell generally cylindrical in form. The half-shells 63 and 64 are made of suitable magnetic material and are flared outwardly at 65, 66, 67 and 68. In assembling the housing 18 around the coil 17, the flared portions 67 and 68 form a circular shroud in close proximity to the tube 15, and this shroud is received within a cylindrical recess 69 formed in nut 43. As the two halved 63 and 64 are brought together, the flared portions 65 and 66 also form a circular shroud enclosing the tube 15. A self-locking circular nut 70, preferably made of aluminum or other nonmagnetic material, is threaded on to the threads 22 formed on the exterior of the fitting 20 and is adapted to be hand tightened. The nut 70 is also formed with an internal cylindrical recess 71 for receiving the shroud created by the flared portions 65 and 66. Advancing the nut 70 forces the two halves 63 and 64 into close physical contact. The shell-half 63 is formed with an outwardly flared radial opening 73 and the half 64 is formed with a similar opening 74. The opening 74 is lined with a suitable grommet 75 to protect the solenoid leads 76 and 77 from chafing. In applications where heat generated by the solenoid 17 may be a problem, cooling air may be forced through the vents provided by the opening 73 and 74.

Referring now to FIGS. 4, 5, 6, 7 and 8, several different forms and views of portions of valve cores 16 are illustrated. Referring particularly to FIG. 4, the valve core 16 is seen to comprise a generally elongated cylindrical body 80 formed with an axial central bore 81, a plurality of radially offset outlet ports 82 communicating with the bore 81, and a valve tip 39. The tip 39 may be formed of hardened material and is properly tapered to fit closely with the valve seat 38. During assembly a light blow on the valve core with a rod inserted into the assembly will enable the valve tip 39 to form its own mating seat in the plug 37 or in the replaceable valve seat material disposed in the plug 37.

It is contemplated that in operation, the fluid to be controlled passes through the bore 81 and is discharged outwardly through the offset outlet ports 82 when the core 16 is raised off its seat under the force of the actuated solenoid 17. The momentum of the fluid discharged through the ports 82 imparts a slight turning moment to the core 16. Repeated actuation of the solenoid 17 and the light hammer blows imparted to the seat 38 whenever the valve tip 39 reseats should have the desired equivalent effect of constant regrinding the valve seat 38 so as to always maintain a perfect fluidtight seal. FIG. 5 shows the probable angle of the reactive forces tending to rotate the core 16 when fluid is being discharged through the ports 82.

Another type of valve core 16A is illustrated in FIG. 6. In this type, the discharge ports 83 are truly radial. This type of core is somewhat easier and less expensive to make than the type with the offset discharge ports. An inverted cup type of valve tip 39A may be formed on the core 16A being adapted to seat on a flat valve seat. A valve tip of the 39A type could be used on any of the valve cores herein illustrated depending on the particular application of the valve.

If on the other hand, a valve tip like 39 is used on the core 16A a relatively soft or pliant seat such as one made of Teflon may be utilized. In such case, the resiliency of the seat may be sufficient to maintain a suitable fluidtight seal, or if the seat is made up in the form of an insert, it can be replaced periodically as required.

A most preferred embodiment for the valve core is shown in FIG. 8, and is designated by the numeral 16B. The core 16B has a body 90 and is formed with an axial bore 91 and radially offset discharged ports 92 similar to the ports 82 of FIGS. 4 and 5 which communicate with bore 91. The body 90 is also formed with an annular reduced portion 93 to form in effect a wide groove giving the core 16B the appearance of a spool. A valve tip 39B that is hemispherical in shape may replace the tapered tip 39. A pair of semicircular sleeves 95 and 96 surround the reduced portion 93. The cross section of the sleeves 95 and 96 is shown by superimposed dotted lines in FIG. 8. The sleeves 95 and 96 are made of very high permeability material, and their axial length is slightly less than that of the length of the reduced portion 93. The sleeves are allowed to slide up and down along the reduced portion 93 and provide a light impact force against the lands 97 and 98 for seating and unseating the core 16B whenever the solenoid 17 is actuated or cut off. The hemispherical tip 39B cooperates with a seat 99 having a low degree of taper to provide a fluidtight seal. The spherical form provides a seal regardless of any slight angular misalignment of the axis of the core 16B with the axis of tube 15.

It will be appreciated that the semicircular sleeve feature can be used with valve cores having either radially offset passages or truly radial passages or a slightly tapered or hemispherical valve tip or the inverted cup type of valve tip.

Referring back to FIG. 1, the outlet control valve 12 comprises a cylindrical tube 115 of nonmagnetic material, a valve core 116, a solenoid 117, and a split-shell housing 118 surrounding the coil 117. An axially extending cylindrical fitting 120 formed with an axially extending bore 121 is attached to the upper end of tube 115 in fluid-sealed relation therewith, and the upper end of the bore 121 is in communication with the bore 52 and provides an inlet port 130 to the valve 12. A cylindrical fitting 137 at the lower end of tube 115 is formed with an axial central bore or orifice 138 which also provides at its upper end a valve seat for the valve tip 139. A fitting 124 provides an outlet port 140 for the valve 12. The fitting 137 may be press-fitted into the tube 115 and secured therein by a plurality of shear pins 141 extending through tube 115 and into fitting 137. These pins 141 may be tubular in structure. The construction and operation of the valve 12 is substantially the same as the valve 11, most of the parts being interchangeable.

A compression spring of the same type as used in valve 11 may be used to help maintain the valve core 116 in a normally seated position and to overcome any residual magnetic effects when the solenoid 117 is deenergized.

A fluid-pressure-responsive mechanism that may be controlled by the valve assembly 10 is shown in longitudinal section in FIG. 9 and is designated by the numeral 200. The mechanism 200 comprises a housing 201 formed with an internal bore 202, a fixed sleeve 203, a spool valve 204, a piston 205, and a plunger 206. Cover plates 207 and 208 are bolted to the ends of the housing 201 and are provided with fluid inlet ports 209 and 210, respectively. The housing 201 is provided with radial ports 211, 212, 213, 214 and 215. The ports 210 and 211 are connected through suitable conduits to a common high-pressure fluid source (not shown). The port 209 is connected through conduit 216 to fitting 56 of the valve block 44. The ports 214 and 215 are connected to power cylinders A and B (not shown), and the ports 212 and 213 exhaust to a fluid sump (not shown).

The valve sleeve 203 is formed with a central bore 220 in which the spool valve 204 is disposed, annular grooves 221, 222 and 223, and radial ports 224, 225 and 226. The groove 221 communicates with the ports 214, the groove 222 with port 211, and groove 223 with port 215. The ports 224, 225 and 226 all open into the bore 220 and are connected to the annular grooves 221, 222 and 223, respectively.

The spool valve 204 is formed with lands 230 and 231 and an elongated annular groove 232 between the lands. The lands 230 and 231 block the ports 224 and 226, respectively, as shown. The piston 205 contacts the upper end 233 of the valve 204, and the plunger 206 contacts the lower end 234 of valve 204. The spool valve 204 is movable longitudinally under the influence of fluid pressure between two limits. The upper limit is reached when the piston 205 contacts the end plate 207, and the lower limit when the land 231 contacts the inner end 235 of the cover plate 208.

In operation, the valve assembly 10 and hydraulic mechanism 200 function as follows. Relatively low pressure fluid or signal pressure is supplied to the inlet port 30 of valve 11, and when the solenoid 17 is actuated the core 16 and tip 39 is raised off the seat 38 allowing the fluid to pass through the outlet port 40, channel 54 and conduit 216 to the port 209. The spool valve 204 and piston 205 will be in their uppermost position until such signal pressure is supplied because of the force developed by the high-pressure fluid supplied through port 210 and acting on plunger 206. In the uppermost position, high-pressure fluid supplied through the port 211 passes through the port 225, through the groove 232 and ports 224 and 214 to power cylinder A. The cross-sectional area of the piston 205 is substantially greater than the cross-sectional area of the plunger 206, and when the signal pressure supplied through port 209 reaches predetermined value, the total force acting on piston 205 will be sufficient to force the valve spool 204 downward to its lowermost limit 235. In this latter position, high-pressure fluid from the port 211 passes through the port 225, groove 232 and ports 226 and 215 to power cylinder B. Any residual fluid pressure in the power cylinder A is permitted to exhaust through the ports 224 and 212.

When operative conditions require that valve 204 be shifted again, such shift is accomplished by energizing solenoid 117. Energizing solenoid 117 causes the core 116 and tip 139 to be raised off the seat 138. Opening of the valve 12 thus releases the pressure applied against piston 205 through port 209, conduit 216, port 130 and outlet port 140 to a fluid sump (not shown). When this pressure has been reduced sufficiently, the force acting through plunger 206 forces the valve 204 and piston 205 to the uppermost position. In this position, high-pressure fluid is again supplied to power cylinder A as previously described, and any residual fluid pressure in power cylinder B is exhausted through port 215, groove 223 and ports 226 and 213 to sump.

The energization of the valves 11 and 12 can be selectively accomplished manually or automatically by providing a suitable sensing mechanism effective to operate switches connected to the solenoids 17 and 117.

The improved solenoid actuated pilot valves of the present invention are designed to provide precise and continuous control over a signal fluid pressure which in turn can effectively control the application of substantially higher pressure fluid. The valve cores of the pilot valves, with their sliding sleeves of high-permeability material, are easily seated and unseated with minimal magnetic force supplied by the respective solenoids because of the slight impact provided by the sliding sleeve. This impact is sufficient to overcome the static friction of the seated valve, and is helpful to maintain the valve seat in uniform shape, when reseating. In addition, the novel split-shell housing for the solenoid provides a construction that is easily assembled and effectively retained in place and also effective to provide an efficient flux-return path for the magnetic field generated by the solenoid.

It is to be understood that the embodiments shown and described are by way of example only and the invention is not to be considered as limited thereto except insofar as the claims may be so limited.

I claim:

1. In a pilot-control valve the combination comprising:
a fluidtight tube of nonmagnetic material;
means defining an inlet port associated with one end of said tube and adapted to be connected to a source of relatively higher fluid pressure;
means defining an outlet port associated with the other end of said tube and adapted to be connected to an environment of relatively lower pressure;
a valve core of magnetic material slidably disposed within said tube and formed with an axial central bore and a plurality of radially offset fluid discharge ports connected to said bore;
means defining a valve seat adjacent said outlet port and adapted to be closed by said valve core; and
a solenoid surrounding said tube and effective when energized to lift said valve core away from said seat to permit the passage of fluid through said outlet port.

2. The combination of claim 1 wherein said valve core carries a valve tip adapted to form a fluid-tight seal with said valve seat.

3. The combination of claim 1 wherein said valve core carries a sleeve of high-permeability material that is effective to impart a slight impact to the core on energization of said solenoid.

4. The combination of claim 2 wherein said tip is hemispherical in shape and said seat is tapered to receive said tip.

5. The combination of claim 2 wherein said valve seat comprises a plastic material.

6. The combination of claim 3 wherein said sleeve comprises a pair of semicylindrical shells that surround said valve core, said shells having an axial length less than that of said core.

7. In a solenoid-actuated pilot-control valve having an inlet port adapted to be connected to a source of relatively higher fluid pressure and an outlet port adapted to be connected to a region of relatively lower pressure the combination comprising:
a fluidtight central tube assembly including a tube of nonmagnetic material, and means defining inlet and outlet ports at opposite ends of said tube;
magnetically responsive valve means disposed within said tube and effective to restrict the flow of fluid through said outlet port;
a solenoid surrounding said tube assembly and effective when energized to create a magnetic field to operate said valve means; and
a split-shell housing of a generally cylindrical configuration surrounding said solenoid and made of magnetic material and split into two parts along an axis substantially parallel to the axis of said solenoid whereby an efficient flux-return path for the magnetic field created by said solenoid is provided.

8. The combination of claim 7 including an enlarged washer of magnetic material disposed at each end of said solenoid within said housing to retain said solenoid and provide a still more efficient flux-return path.

9. The combination of claim 7 wherein said split-shell housing is in two halves with each half having an outwardly flared axial opening which in the valve forms an encircling shroud around said tube assembly.

10. The combination of claim 9 wherein:
said halves are formed with outwardly flared axial opening at both of their axial ends and both forming encircling shrouds around said tube assembly; and
means defining a circular recess surrounding said tube assembly and adapted to receive one of said encircling shrouds.

11. The combination of claim 9 including a circular retaining means adapted to be mounted in said tube assembly and formed with a circular recess for receiving the other encircling shroud to thereby effectively clamp the two halves of said housing together.

12. The combination of claim 7 including:
a mounting block for mounting said valve therein, said block having fluid passage means formed therein for communication with a fluid-pressure-responsive mechanism;
threaded bore means formed in said mounting block for receiving said valve therein; and
threaded retaining means surrounding said tube assembly and engaging said threaded bore means to secure said valve in said mounting block.

13. A pilot-control valve assembly comprising:
a pair of solenoid-operated valves for controlling respectively the application of fluid pressure from a source to a fluid-pressure-responsive mechanism and the release of fluid pressure from the fluid-pressure-responsive mechanism;
a valve-mounting block for securing said two valves therein, said mounting block having fluid passage means therein for communication with the fluid-pressure-responsive mechanism;
said valves being secured in said mounting block in such a manner that the outlet of one of said valves and the inlet of the other of said valves are in fluid communication with said mounting-block fluid-passage means.

14. The pilot control valve assembly of claim 13 wherein said mounting block is formed with two bores for securing therein the outlet end of one of said valves and the inlet end of the other valve.

15. The pilot control valve assembly of claim 13 wherein:

said mounting block is formed with two threaded bores for securing therein the outlet end of one of said valves and the inlet end of the other valve; and further including retaining nuts which surround the respective ends of said valves and are respectively threadably secured into said mounting block bores to secure said valves in said mounting block.

16. The pilot control valve assembly of claim 13 wherein:

each valve includes a split-shell housing of a generally cylindrical configuration surrounding the solenoid of each valve and made of magnetic material and split along an axis substantially parallel to the axis of the solenoid; and said mounting block is formed with two threaded bores for securing therein the outlet end of one of said valves and the inlet end of the other valve, and further includes retaining nuts which surround respectively said outlet end and said inlet end and are respectively threadably secured into said mounting block bores to secure said valves in said mounting block.

17. The combination of claim 2 wherein said tip is formed with an inverted cup cross section.